(12) United States Patent
Paulussen et al.

(10) Patent No.: US 7,878,688 B2
(45) Date of Patent: Feb. 1, 2011

(54) LAMP ASSEMBLY

(75) Inventors: Elvira Johanna Maria Paulussen, Eindhoven (NL); Peter Alexander Duine, Eindhoven (NL); Denis Joseph Carel Van Oers, Eindhoven (NL); Antonius Cornelis Van Den Broek, Roosendaal (NL); Johannes Trudo Cornelis Van Kemenade, Eindhoven (NL); Wouter Lambertus Petrus Willaert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 248 days.

(21) Appl. No.: 12/096,613

(22) PCT Filed: Dec. 11, 2006

(86) PCT No.: PCT/IB2006/054747

§ 371 (c)(1),
(2), (4) Date: Jun. 9, 2008

(87) PCT Pub. No.: WO2007/069185

PCT Pub. Date: Jun. 21, 2007

(65) Prior Publication Data

US 2008/0298054 A1    Dec. 4, 2008

(30) Foreign Application Priority Data

Dec. 12, 2005    (EP) .................. 05111947

(51) Int. Cl.
*F21V 7/10* (2006.01)
*F21V 3/00* (2006.01)

(52) U.S. Cl. .............. 362/296.1; 362/184; 362/227; 362/235; 362/240; 362/241; 362/246; 362/249.02; 362/311.01; 362/311.02; 362/311.12

(58) Field of Classification Search ............... 362/84, 362/184, 227, 230, 231, 235, 236, 240, 241, 362/245, 246, 249.02, 296.1, 311.01, 311.02, 362/311.12, 355

See application file for complete search history.

(56) References Cited

U.S. PATENT DOCUMENTS

| | | | | | |
|---|---|---|---|---|---|
| 2,177,717 | A | * | 10/1939 | Hoeveler | 362/303 |
| 3,875,456 | A | * | 4/1975 | Kano et al. | 313/501 |
| 5,836,676 | A | * | 11/1998 | Ando et al. | 362/244 |
| 6,038,005 | A | * | 3/2000 | Handschy et al. | 349/61 |
| 2002/0080622 | A1 | * | 6/2002 | Pashley et al. | 362/555 |
| 2004/0080938 | A1 | * | 4/2004 | Holman et al. | 362/231 |
| 2004/0141324 | A1 | * | 7/2004 | Sales | 362/333 |
| 2005/0219476 | A1 | * | 10/2005 | Beeson et al. | 353/98 |

\* cited by examiner

*Primary Examiner*—Sandra L O Shea
*Assistant Examiner*—Danielle Allen

(57) ABSTRACT

The invention relates to a lamp assembly (1) for illuminating a surface (S) comprising a chamber (3) accommodating a plurality of light-emitting diodes (11R, 11G, 11B) capable of emitting visible light. The lamp assembly comprises diffusing means (12) capable of diffusing said visible light of said light-emitting diodes to produce diffuse light (D), and said chamber further accommodates collimation means (5) arranged to collimate at least a portion of said diffused light for illuminating said surface. The lamp assembly is especially suitable for ambiance and atmosphere lighting applications.

12 Claims, 3 Drawing Sheets

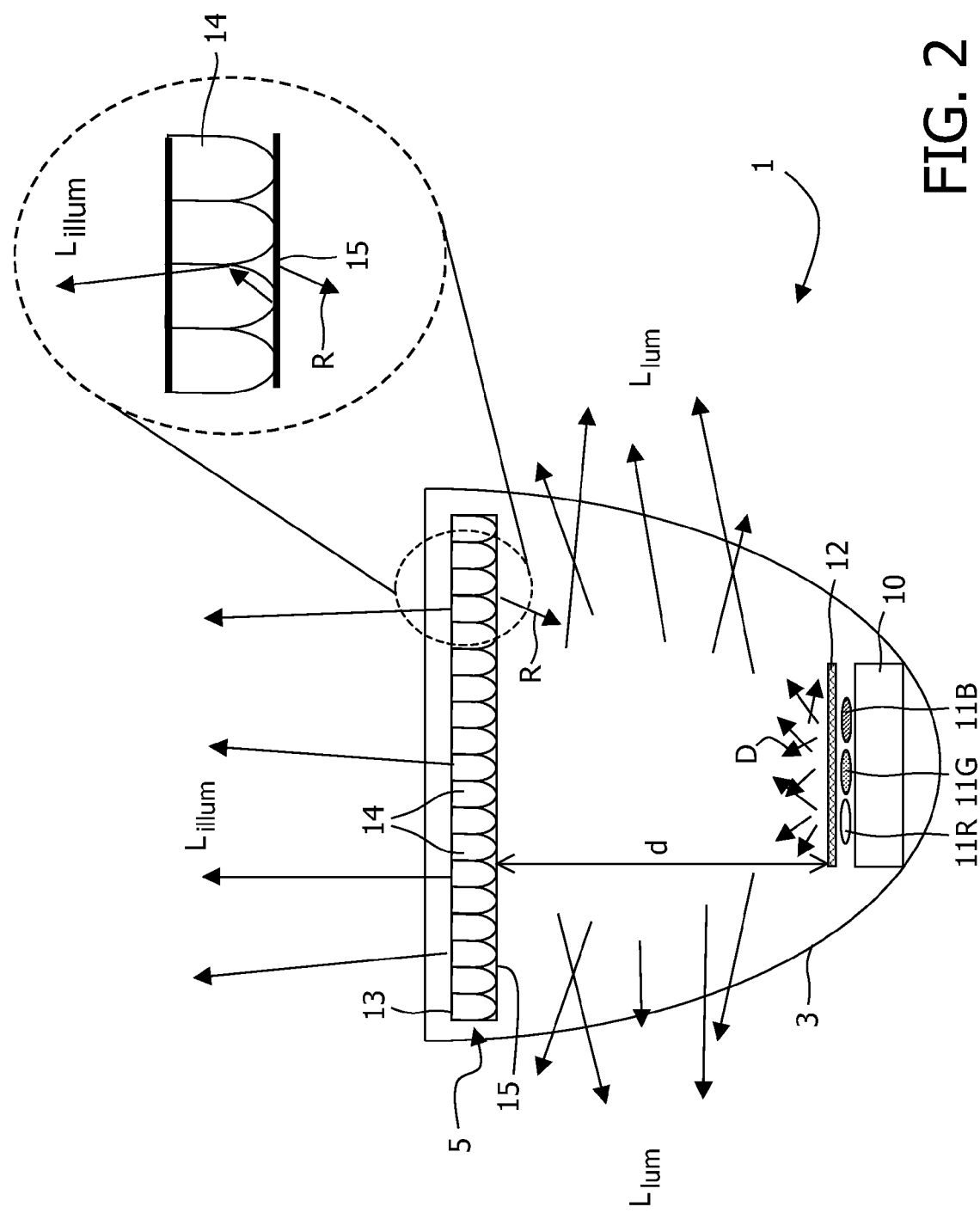

LAMP ASSEMBLY

FIELD OF THE INVENTION

The invention generally relates to a lamp assembly. More specifically, the invention relates to a lamp assembly which is capable of illuminating a surface by a plurality of light-emitting diodes.

BACKGROUND OF THE INVENTION

Light sources are frequently applied in several types of atmosphere and ambience lighting applications for creating mood in e.g. a living room. These light sources increasingly comprise a plurality of light-emitting diodes (LEDs) that may emit different colors. Mixing of colors and collimation of the light beams are particularly relevant issues for these lighting applications.

US 2003/0076034 discloses a LED chip package with four LED chips and integrated optics for collimating and mixing light. A LED chip package includes a base, an array of LED chips disposed on the base, and a collimator mounted on the base, over the array of light-emitting diode chips. The LED chips of the array are typically arranged in an inline configuration. The collimator is generally configured as a rectangular, horn-like member and typically includes a first set of walls that collimate the light emitted by the LED chips in a first direction and a second set of walls that minimally collimate the light emitted by the LED chips in a second direction.

The performance of the prior-art system is inadequate in terms of color mixing and collimation of light for atmosphere and ambience lighting applications.

OBJECT AND SUMMARY OF THE INVENTION

It is an object of the invention to provide a lamp assembly having an improved color mixing and light collimation performance.

To this end, a lamp assembly is provided for illuminating a surface, the lamp assembly comprising a chamber accommodating a plurality of light-emitting diodes capable of emitting visible light. The lamp assembly comprises diffusing means capable of diffusing said visible light of said light-emitting diodes to produce diffuse light, and said chamber further accommodates collimation means arranged to collimate at least a portion of said diffused light for illuminating said surface.

By providing a diffusion means in such a way that substantially all light emitted by the light-emitting diodes is diffused, optimal mixing of light is accomplished before it reaches the collimation means to illuminate the surface. This is realized by positioning the diffusion means near the light-emitting diodes, i.e. at a distance of less than a quarter or preferably less than one-tenth of the dimension of the largest cross-section of the chamber.

The embodiment of the invention as defined in claim 2 ensures that nearly all light emitted by the light-emitting diodes is diffused. The diffusing means is preferably provided very near the light-emitting diodes as defined in claim 3 or 4.

The embodiment of the invention as defined in claim 5 is suitable for the collimation means. The collimator plate preferably covers the entire exit area of the chamber, such that light directed to the surface to be illuminated is collimated before it leaves the lamp assembly.

The embodiment of the invention as defined in claim 6 provides a means for recycling a portion of the light that does not leave the chamber directly via the collimation means. In this embodiment, the chamber of the lamp assembly functions as a light-mixing chamber.

The embodiment of the invention as defined in claim 7 provides the advantage that the surface can be illuminated in a colored fashion. The diffuse reflective surface of the cavity provides efficient color mixing in this embodiment.

The embodiment of the invention as defined in claim 8 provides the advantage that, for LEDs emitting light of the same color, variations of light flux and color between individual LEDs around average values (also referred to as binning) can be (partly) compensated.

The embodiment of the invention as defined in claim 9 provides the advantage that luminance is obtained for the lamp assembly itself. Such a feature is highly appreciated by consumers for atmosphere and ambience lighting applications. It is noted that the light-transmitting walls are preferably translucent but may alternatively be transparent.

The embodiment of the invention as defined in claim 10 ensures tailoring of the light of the lamp assembly for ambience or atmosphere applications in accordance with user preferences.

The embodiment of the invention as defined in claim 11 provides automatic tailoring of the light of the lamp assembly in accordance with the sensed environment. As an example, the sensor may detect a user's mood or emotion by means of a camera or microphone and adapt the emitted light, in particular the color and brightness of the emitted light, accordingly.

It should be appreciated that the subject matter of one or more of the claims, or aspects thereof, may be combined.

The invention will be further illustrated with reference to the attached drawings, which schematically show preferred embodiments of the invention. It will be understood that the invention is by no means limited to these specific and preferred embodiments.

BRIEF DESCRIPTION OF THE DRAWINGS

In the drawings:

FIG. 2 illustrates the lamp assembly of FIG. 1 in more detail, and

DESCRIPTION OF EMBODIMENTS

Figure 1:
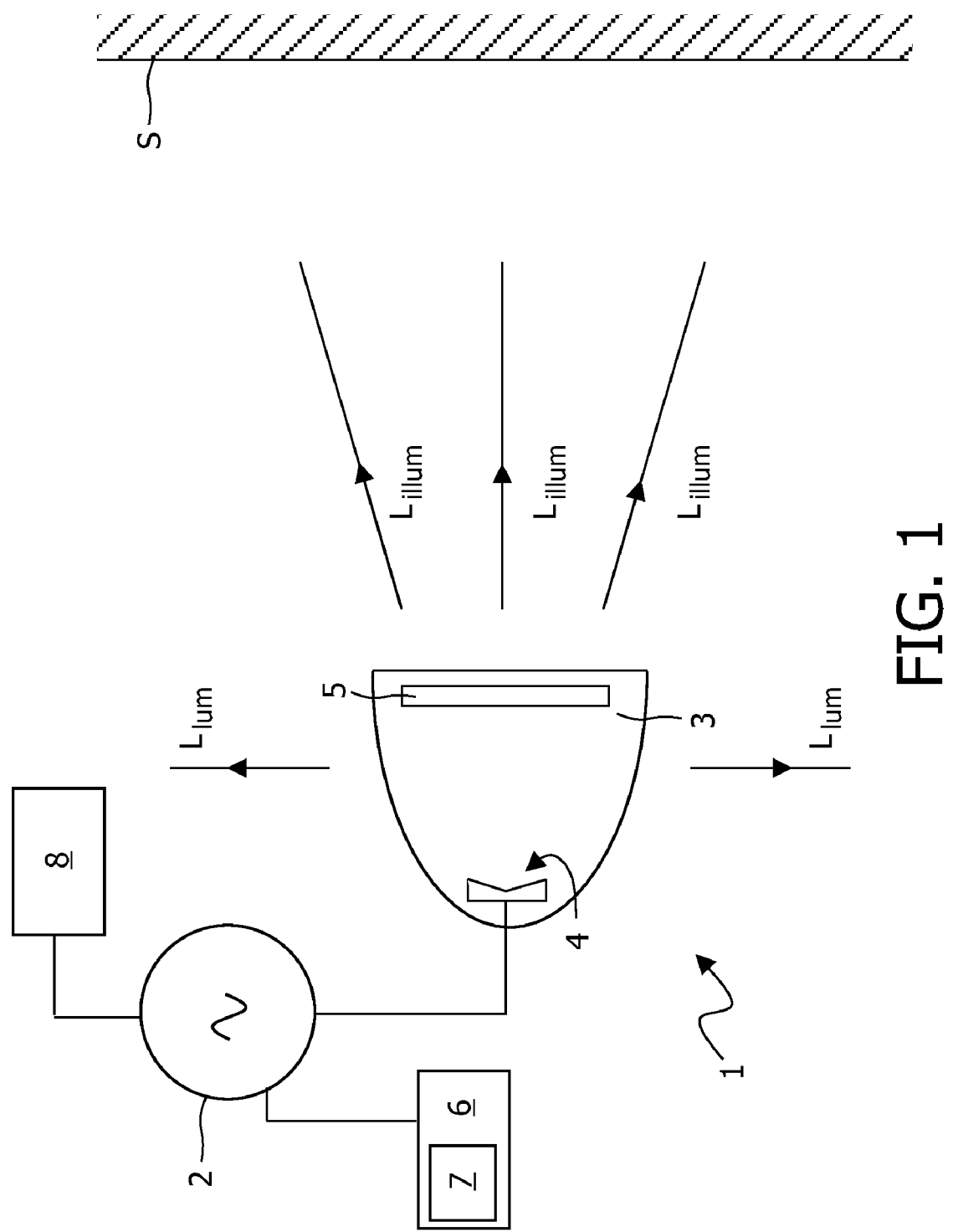
FIG. 1 illustrates a lamp assembly illuminating a surface in accordance with an embodiment of the invention.

FIG. 1 illustrates a lamp assembly 1 illuminating a surface S. The lamp assembly 1 is connected to a power supply 2 and comprises a light-transmitting chamber 3 accommodating a lighting means 4. The chamber 3 may be e.g. of plastic and comprise light-scattering particles. The chamber 3 comprises a collimating means 5 that faces the surface S so that a large amount of the light originating from the lighting means 4 is directed as a collimated light beam $L_{illum}$ towards the surface S. As an example, 90% of the light may be directed towards the surface S as collimated light $L_{illum}$, whereas 10% of the light accounts for luminance of the chamber 3 through its light-transmitting walls (indicated by the arrows $L_{lum}$). However, it should be appreciated that the walls of the chamber 3 may also (partly) comprise a reflective surface so as to increase the amount of light provided at the surface S. The lamp assembly 1 is connected to a control device 6 that controls the operation of the lamp assembly 1, in particular with respect to the brightness, hue (in CIELAB color space) and saturation of the light $L_{illum}$ and $L_{lum}$ originating from the lighting means 4, by controlling the current or voltage provided to the lighting means 4 via the power supply 2. The control device 6 allows a user to control the light generated by the lamp assembly 1 in accordance with his preferences and preferably allows him to manually navigate along the brightness axis, hue axis and saturation axis. Factory presets may be installed. The control device 6 may have a memory 7 to allow storage of user-preferred settings.

Furthermore, a sensor 8 is provided to automatically control the lighting characteristics (e.g. color, brightness) of the lamp assembly 1. The sensor 8 may be e.g. a camera or microphone to detect a user's mood or emotion. A camera may e.g. detect the presence of people, the activities of people (watching TV, having dinner) or, in a more advanced embodiment, detect facial expressions (smiling, sadness) and adapt the light of the lamp assembly 1 accordingly.

FIG. 2 illustrates the lamp assembly 1 of FIG. 1 in more detail. The lighting means 4 comprises a base 10 carrying a plurality of light-emitting diodes 11R, 11G and 11B which are capable of emitting red, green and blue visible light, respectively. It should be appreciated that the lighting means 4 may comprise more than three light-emitting diodes. Furthermore, the light-emitting diodes may be diodes which are capable of emitting visible light of the same color.

A diffuser plate 12 is provided directly over the light-emitting diodes 11R, 11G and 11B. Instead of over a full diffuser plate 12, each light-emitting diode 11R, 11G, 11B may have a separate light-diffusing means, such as a diffusive lens (not shown). The diffusing means 12 is provided at a distance d from the collimating means 5. The distance d is preferably in the range of 10-50 mm, depending on the shape and amount of collimating elements of the collimating means 5.

The collimating means 5 comprises a collimating plate 13 having a plurality of collimating elements 14 arranged in a two-dimensional array. The collimating elements 14 are preferably light guides that may comprise hollow light pipes or massive light guides.

A surface 15 of the collimating plate 13 is reflective to light leaving the diffusing plate 12.

In operation, the light-emitting diodes 11R, 11G, 11B are stimulated to emit visible light. Before the visible light is allowed to leave the lamp assembly 1, it hits the diffuser plate 12 to produce diffuse light D. The diffuser plate 12 may provide a Lambertian emission pattern of diffused light D into a substantially full π solid angle. The diffuse light D consists almost entirely of homogeneously mixed light resulting from the light-emitting diodes 11R, 11G, 11B having passed the diffuser plate 12.

A portion of the diffuse light D hits the transparent walls of the chamber 3 and leaves the lamp assembly 1 as light $L_{lum}$ to provide a luminance character to the lamp assembly 1. Another portion of the diffuse light D hits the collimating plate 13. A portion of this light is collimated by the collimating elements 14 and illuminates the surface S with light $L_{illum}$. Another portion of this light, indicated by R, is reflected back into the chamber 3 at the reflective surface 15 of the collimating plate 13. Consequently, the reflected light R is available for further color mixing within the chamber 3. This light R eventually leaves the chamber 3, possibly after further reflections, either via the transparent walls of the chamber 3 to contribute to the light $L_{lum}$ or via the collimating elements 14 to contribute to the light $L_{illum}$.

Figure 3A:
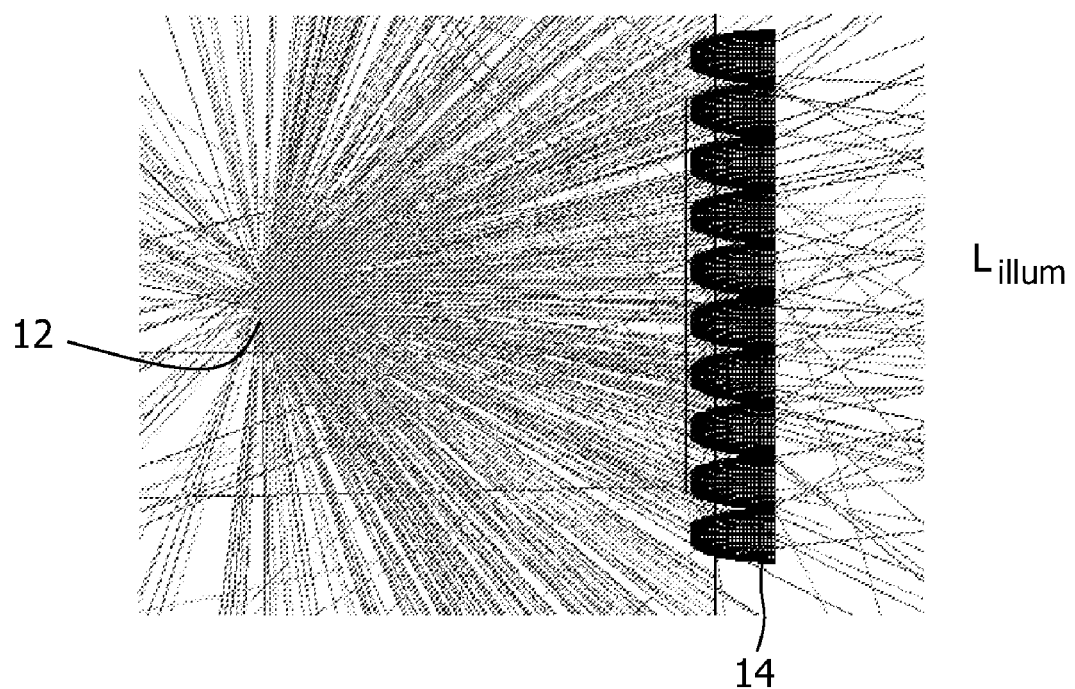
FIGS. 3A and 3B show simulation results for the lamp assembly of FIG. 2.
Figure 3B:
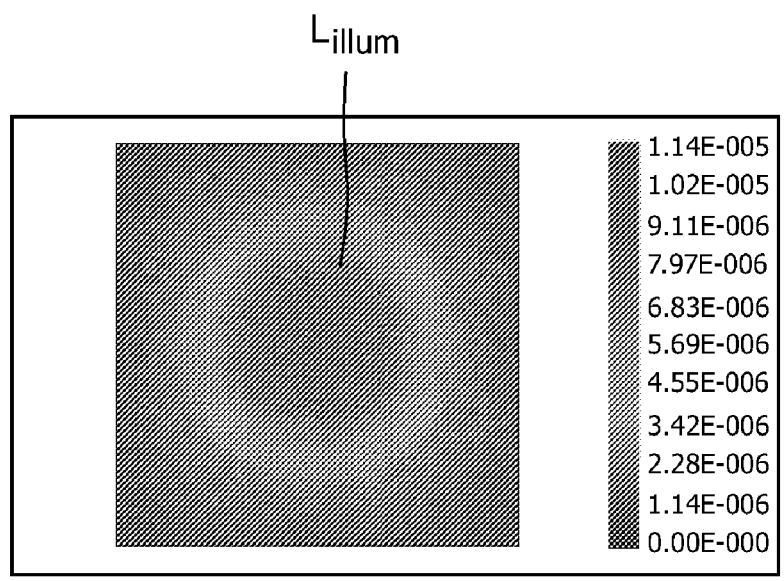

FIGS. 3A and 3B show simulation results. It is clear from the simulation and the described operation of the assembly 1 that, by diffusing the visible light of the light-emitting diodes 11R, 11G, 11B at the source, both the light $L_{lum}$ for the luminous appearance of the lamp assembly 1 itself and $L_{illum}$ for illuminating the surface S comprises adequately mixed light, while the light for illuminating the surface S is adequately collimated as well. In particular, substantially every collimating element 14 is exposed to the same amount of diffused light D of the light-emitting diodes 11R, 11G, 11B.

In the claims, any reference signs placed between parentheses shall not be construed as limiting the claim. Use of the verb "comprise" and its conjugations does not exclude the presence of elements or steps other than those stated in a claim. Use of the indefinite article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A lamp assembly for illuminating a surface having a chamber accommodating a plurality of light-emitting diodes capable of emitting visible light, wherein said assembly includes a diffuser directly adjacent to and in optical alignment with said light-emitting diodes and capable of diffusing said visible light of said light-emitting diodes to produce diffuse light, and said chamber further having a light exit aperture opposite said light-emitting diodes and a collimator spanning substantially across said light exit aperture and arranged to collimate at least a portion of said diffused light for illuminating said surface, wherein said collimator opposing said light-emitting diodes allows a portion of said visible light to pass through said collimator and reflects a portion back into said chamber.

2. The lamp assembly according to claim 1, wherein said diffuser is provided adjacent said light-emitting diodes.

3. The lamp assembly according to claim 1, wherein said diffuser comprises a diffuser plate provided on or over said light-emitting diodes.

4. The lamp assembly according to claim 1, wherein each light-emitting diode individually has a separate diffuser associated therewith.

5. The lamp assembly according to claim 1, wherein said collimator is a plate comprising a plurality of collimating elements, said plate being accommodated in said chamber opposite said light-emitting diodes.

6. The lamp assembly according to claim 1, wherein said collimator has a surface directed towards said light-emitting diodes capable of reflecting a portion of said diffuse light back into said chamber.

7. The lamp assembly according to claim 1, wherein said light-emitting diodes comprise at least light emitting diodes which are capable of emitting visible light of a first color and light emitting diodes which are capable of emitting visible light of a second color.

8. The lamp assembly according to claim 1, wherein said light-emitting diodes are diodes which are capable of emitting visible light of the same color.

9. The lamp assembly according to claim 1, wherein said chamber comprises light-transmitting walls.

10. The lamp assembly according to claim 1, wherein said light-emitting diodes are capable of emitting colored visible light on application of an operating current or operating voltage, and said lamp assembly is further connectable to a control device for controlling said operating current or operating voltage to manipulate the brightness level, hue and/or saturation of said visible light.

11. The lamp assembly according to claim 1, wherein said lamp assembly is connectable to a sensor to control operation of said light-emitting diodes.

12. A lamp assembly, comprising:

an optical chamber formed by optical chamber walls extending upward from a plurality of LEDs to a light exit aperture;

a diffuser optically positioned between said LED; and said light exit aperture;

a light collimator positioned between said diffuser and said light exit aperture, said collimator having a plurality of individual collimating elements;

said collimator further having a lower surface which reflects a portion of light from said plurality of LED's into said chamber and allows a portion of light from said LED's to pass therethrough;

wherein said optical chamber walls allow a portion of light to pass through said walls.

* * * * *